(12) United States Patent
Moua et al.

(10) Patent No.: US 6,360,050 B1
(45) Date of Patent: Mar. 19, 2002

(54) HIGH DENSITY FIBER DISTRIBUTION TRAY SYSTEM

(75) Inventors: Teng K. Moua, Greenacres; Reese G. Larson, Spokane, both of WA (US); Blaise G. Blair, Post Falls, ID (US); Lindsay D. Standish, Spokane, WA (US); Ted C. Vollmer, Spokane, WA (US); Paul A. Knight, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/658,297

(22) Filed: Sep. 8, 2000

(51) Int. Cl.[7] .................................................. G02B 6/00
(52) U.S. Cl. ...................................... 385/135; 385/136
(58) Field of Search ................................ 385/135, 136, 385/134, 137, 147, 139, 53, 76, 77

(56) References Cited

U.S. PATENT DOCUMENTS

| | | | |
|---|---|---|---|
| 4,630,886 A | | 12/1986 | Lauriello et al. |
| 4,699,455 A | | 10/1987 | Erbe et al. |
| 4,765,710 A | | 8/1988 | Burmeister et al. |
| 4,824,196 A | | 4/1989 | Bylander |
| 4,995,688 A | | 2/1991 | Anton et al. |
| 5,069,519 A | * | 12/1991 | James et al. ............... 385/32 |
| 5,100,221 A | | 3/1992 | Carney et al. |
| 5,129,030 A | | 7/1992 | Petrunia |
| 5,142,606 A | | 8/1992 | Carney et al. |
| 5,167,001 A | * | 11/1992 | Debortoli et al. .......... 385/135 |
| 5,402,515 A | | 3/1995 | Vidacovich et al. |
| 5,490,229 A | | 2/1996 | Ghandeharizadeh et al. |
| 5,497,444 A | | 3/1996 | Wheeler |
| 5,717,810 A | | 2/1998 | Wheeler |
| 5,758,003 A | | 5/1998 | Wheeler et al. |
| 5,778,131 A | * | 7/1998 | Llewellyn et al. .......... 385/135 |
| 5,946,440 A | | 8/1999 | Puertz |

FOREIGN PATENT DOCUMENTS

| | | | |
|---|---|---|---|
| AU | 40995/85 | 4/1985 | |
| AU | P 35 11 653.6 | 3/1986 | |
| DE | 2735106 | 4/1977 | |
| DE | 3308682 | 11/1983 | |
| EP | 0 146 478 A2 | 12/1984 | ............ G02B/6/44 |
| EP | 0 149 250 A2 | 12/1984 | ............ G02B/6/44 |
| EP | 0 196 102 B1 | 3/1986 | ............ G02B/6/38 |
| EP | 0 196 102 A2 | 3/1986 | ............ G02B/6/38 |
| EP | 0 211 208 A1 | 6/1986 | ............ G02B/6/44 |
| EP | 0 406 151 A2 | 5/1990 | ............ G02B/6/44 |
| EP | 0 479 226 A1 | 10/1991 | ............ G02B/6/44 |
| EP | 0 538 164 A1 | 10/1992 | ............ G02B/6/44 |
| JP | 59-74523 | 4/1984 | ............ G02B/7/26 |
| JP | 60-169811 | 9/1985 | ............ G02B/6/24 |
| JP | 61-55607 | 3/1986 | ............ G02B/6/00 |

* cited by examiner

Primary Examiner—Brian Sircus
Assistant Examiner—Chandrika Prasad
(74) Attorney, Agent, or Firm—Wells St. John P.S.

(57) ABSTRACT

Disclosed is a fiber optic connector tray system for improved fiber optic cable management, especially in situations requiring higher fiber optic cable and connector density. Embodiments of the invention include tray bodies which are mounted to a framework and pivot or rotate to provide access to fiber optic connectors. The pivot or rotation further provides a mechanism to take up additional slack resulting from the pivoting.

30 Claims, 9 Drawing Sheets

HIGH DENSITY FIBER DISTRIBUTION TRAY SYSTEM

TECHNICAL FIELD

This invention relates to a fiber optic cable distribution tray system particularly well suited for use for high density fiber optic cable applications.

BACKGROUND OF THE INVENTION

In the telecommunications industry there are numerous locations where a significant amount of fiber optic cable must be routed within a facility or from one facility to another. The number of fibers may be great and the fibers must all be handled with great care to avoid damage to the fiber optic cable, which hinders its performance. For instance, it is important to maintain a minimum bend radius to protect the fiber optic cables. A minimum bend radius may for example be one and one-half inches, or it may be thirty millimeters (30 mm).

Fiber optic cable distribution frames, bays or panels are generally utilized to provide termination, cross-connect, splice, patch and storage interface between fiber-optic cables that lead to user installations.

These bays typically include high density fiber distribution frameworks which include fiber-optic cross connection and/or patching functions or features. Typically, but not always, outside plant (OSP) fiber optic cables are routed o the facility and need to be connected to equipment or to other fiber optic cable.

The increase in use of telecommunication fiber optic cables has brought with it the need to increase the capacity of existing facilities, and the need to increase the density of connections or inter-connections per given area.

As density increases and the vertical spacing between fiber optic connectors decreases, the management of the fiber optic cable becomes more and more difficult due to the geometrical limitations imposed by the decreased spacing of the fiber optic connectors and the management and routing of the fiber optic cables.

In fiber distribution frameworks and applications, the management of the fiber is important, especially applications which include a higher density of fiber optic cables.

It is desirable to provide a high density fiber distribution frame and tray system which provides easy access and cable management which reduces slack in fiber optic cables routed through the tray system.

BRIEF DESCRIPTION OF THE DRAWINGS

Preferred embodiments of the invention are described below with reference to the accompanying drawings, which are briefly described below.

FIG. 4 is a top view of the fiber optic connector tray illustrated in FIG. 3;

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "framework" as used herein need not be continuous or in any specific number of pieces. However it will be appreciated by those skilled in the art that the framework could be one piece, two piece or more than two pieces. Furthermore, the framework as contemplated by this invention need not be in one continuous section, but instead may also be divided up into multiple sections or segments.

The term "fiber optic connector" or "connector" as used herein is well known and defined in the art, and is intended to broadly cover all types and kinds of connectors, past and future, no one of which is necessary to practice this invention. Generally a connector is a mechanical device used to align and join two fiber optic cables together to provide a means to attach and decouple it to transmitters, receivers or to another fiber. Commonly used connectors are without limitation, ST Connector-Compatible connectors, FC, FCPC, Biconic, SC, E2000, D4, and SMA 905 or 906 connectors.

The term mounting fiber optic connectors as used in relation to the mounting of the fiber optic connectors, means the direct or indirect mounting of the fiber optic connectors, which may be held in or by fiber optic adapters (which are generally known by those of ordinary skill in the art), and/or by fiber optic adapter holders or structures.

The term framework as used in relation to the first end of the tray mount structure being adapted to mount to the framework structure, may include any type of frame (such as a fiber distribution frame), cabinet, wall or other structure to which it may be desired to mount the tray mount structure.

The term "fiber optic adapter" or "adapter" as used herein is also well known and defined in the art, and is the apparatus which retains the fiber optic connectors and provides the structure to hold the fiber optic connectors and to mount the connectors to other equipment, panels, bulkheads, frameworks, and the like. Adapter is sometimes also referred to as a coupling or mating bushing in the industry.

Figure 1:
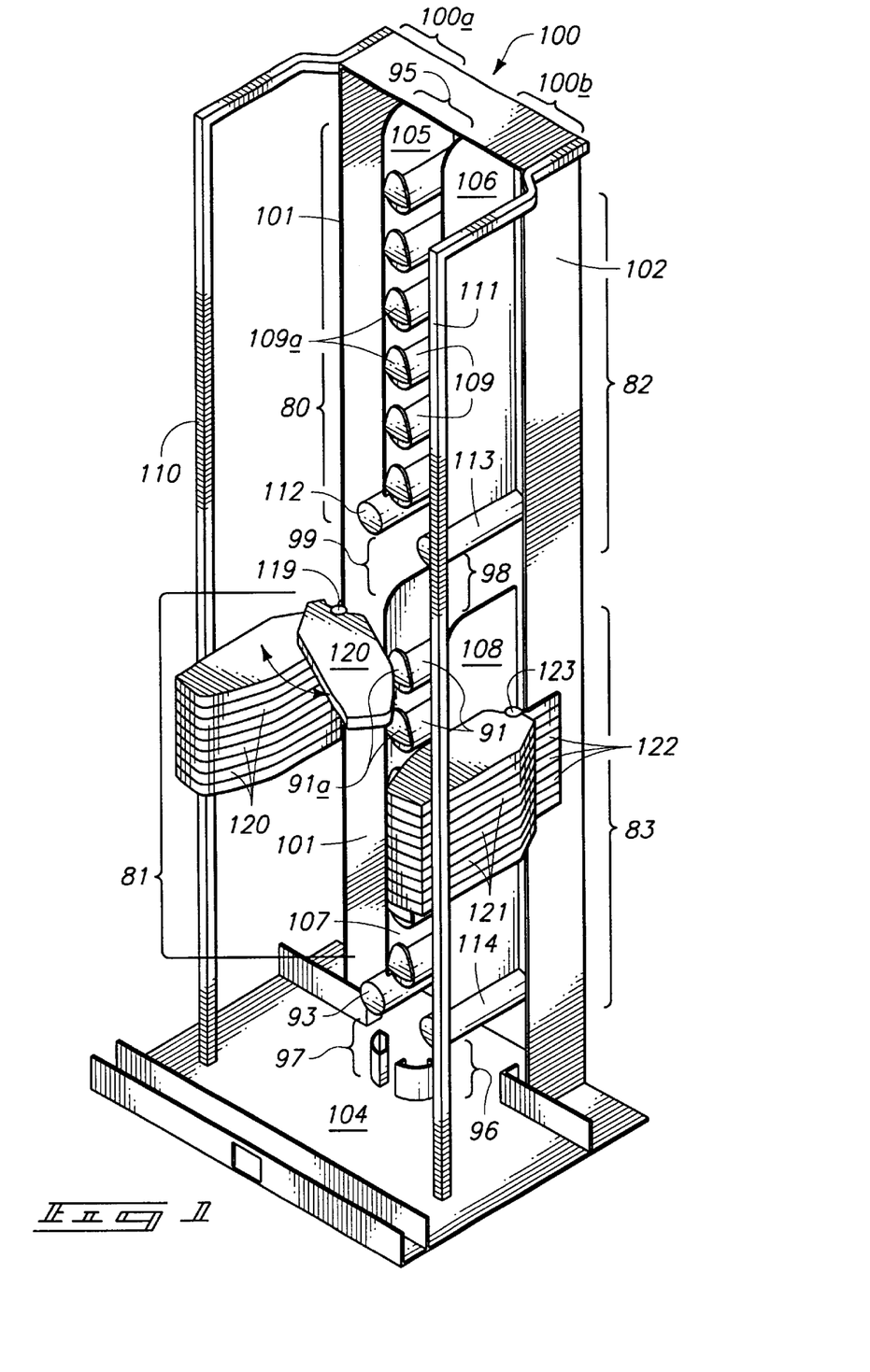
FIG. 1 is a perspective view of one embodiment of this invention, illustrating a framework with a plurality of fiber optic connector trays mounted on each side thereof.

FIG. 1 is a perspective view of one embodiment of a fiber distribution frame or bay as contemplated by this invention. FIG. 1 illustrates fiber distribution frame 100 with a framework consisting of top 103, a first side 101, a second side 102, and a bottom 104. Vertically oriented and attached to the framework are first wall 105, second wall 107, third wall 106 and fourth wall 108. First wall 105 and second wall 107 combine to form a wall partition with a transverse fiber optic cable pathway 99 between the two to allow fiber from the plurality of fiber optic connector trays 120 to be routed into fiber support area 95, routed on one or more of fiber supports 109 and preferably through transverse fiber optic cable pathway 98 and then to one of fiber optic connector trays 121 on the second side of the framework.

Fiber optic cables from fiber optic connector trays 120 which are located below transverse fiber optic cable pathway 99 are preferably routed downward, around fiber optic bend protector 113, looped or supported on one or more of fiber supports 91, routed back downward through transverse fiber pathway 96, and around fiber optic bend protector 114, where they can be connected to a fiber optic connector within one of fiber optic connector trays 121.

It is preferable that fiber from fiber optic connector trays 120 on the first side 100a of the framework, and above transverse fiber optic cable pathway 99, be routed into the fiber support area above transverse fiber pathway 99, and then routed through transverse fiber pathway 98 and upward to fiber optic connector trays 121 which positioned above the second transverse fiber pathway 98 (additional fiber optic connector trays 121 would normally also be positioned above the fiber pathway 98, which are not shown in the drawing).

Fiber optic bend protectors 112, 113, 93 and 114 provide minimum bend radius protection for fiber optic cables being routed through transverse fiber optic cable pathways 99, 98, 97 and 96.

Similarly, the upper portion of the framework, fiber optic cables routed from fiber optic connector trays 120 which are below first transverse fiber pathway 99, are preferably routed downward and around fiber optic bend protector 93, up into the fiber support area, looped or supported by one or more fiber supports 91, routed back downward around fiber optic bend protector 114, and then back upward to one or more of fiber optic connector trays 121.

Fiber optic connector trays 120 and 121 are pivotally mounted to the framework such that they rotate about the respective pivot points or axis, first axis 119 on the first side 100a of framework, and about axis 123 mounted to second side 100b of the framework. Mount arms 122 are utilized to mount fiber optic connector trays 121 to the second side 100b of the framework.

One of fiber optic connector trays 120 is shown pivoted inward about axis 119, and the tray and method of pivoting is described more fully below in relation to other figures.

The fiber supports 109 and 91 each have fiber optic support surfaces disposed to receive and support fiber optic cables in such a way that minimum bend radius is met. Each of the fiber supports also has a rotatable end piece 109a and 91a, which may be rotated to any desired angle around fiber supports 109a or 91 to ease the access and movement of fiber optic cables supported thereon, and also to minimize displacement. For example, when fiber support end pieces 109 or 91a are rotated to be in a downward position, described more fully in later figures, fiber may much more easily be removed from the fiber support and rerouted without substantial displacement by having to move the fiber up over the end support, as required in prior art.

FIG. 1 also shows the framework with the first side 100a including a first section 80 above a second section 81, and the second side 100b including a third section 82 above a fourth section 84.

Figure 2:
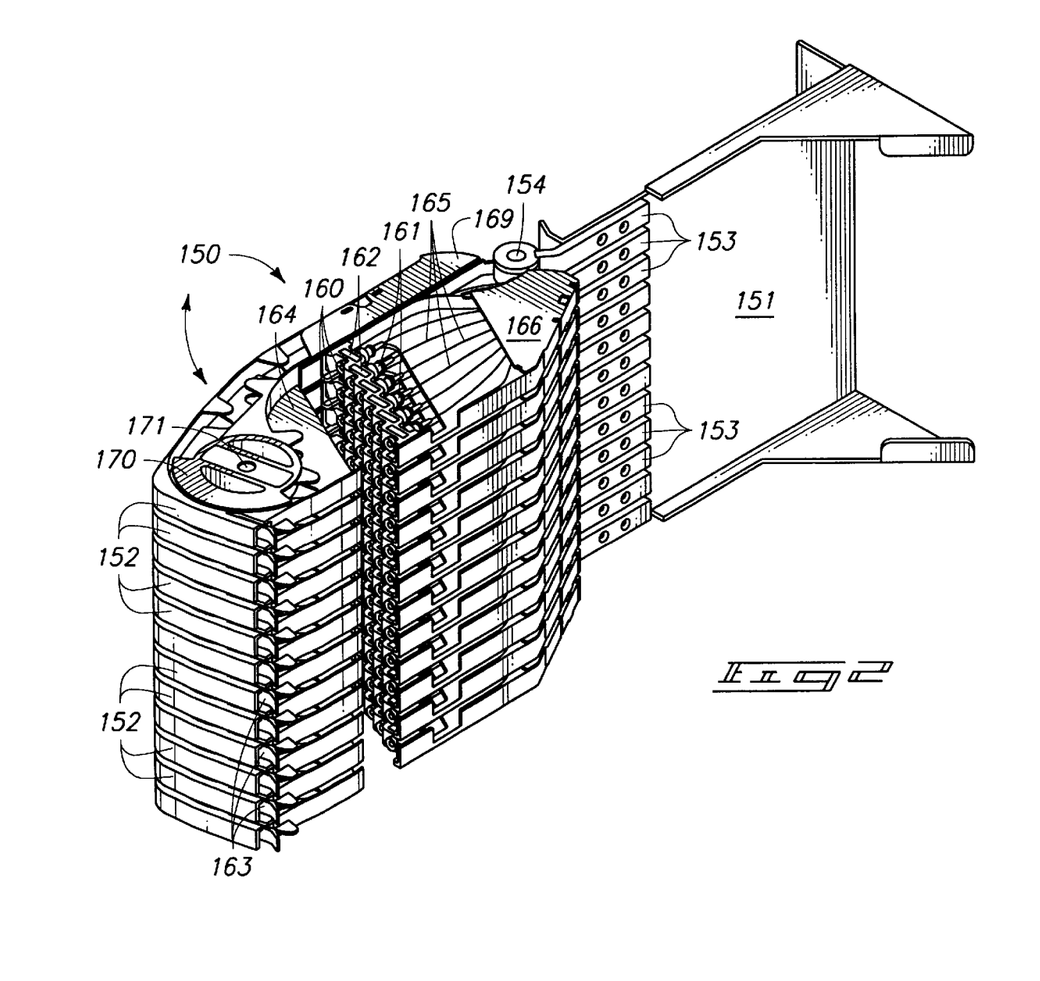
FIG. 2 is a perspective view of one embodiment of a fiber optic tray module which may be mounted to the framework within a contemplation of this invention.

FIG. 2 shows another embodiment of a fiber optic connector tray assembly which may be mounted to the framework shown in FIG. 1 or any other location where high density of fiber optic connectors is desired. Fiber optic connector trays 152 are pivotally mounted to module framework 151 through mount arms 153 and about pivot 154 or axis 154. The fiber optic connector trays 152 illustrated in FIG. 2 may be rotated away from the viewer for access to fiber optic connector 161, fiber optic connector 160, which are operatively attached to one another via fiber optic adapter 162.

FIG. 2 also illustrates fiber optic cables 165 attached to fiber optic connectors 161 and routed back toward module framework 151.

Fiber optic cable operatively attached to fiber optic connectors 160 will generally be routed around fiber control lid 170, through the fiber pathway which continues under fiber pathway cover 169 and back toward module framework 151.

Throughout the routing of the fiber optic cable through the fiber optic connector trays 152, minimum bend radius is always maintained.

In order to better facilitate the management, through retention and bend radius protection, as well as minimization of displacement, fiber control lid 170 may be rotated about axis 171 to allow better access to fiber optic cable throughout the fiber optic pathway 167 through pathway 168. The fiber optic connector module 150 is versatile and provides higher density than heretofore provided. Partial tray cover 166 likewise rotates outward, as shown in later figures, to provide protection and retention in a dispersed position but to rotate or pivot outward to a second position such that fiber optic cables 165 may be more easily accessed and handled. It is preferable that fiber optic connector trays 152 be aligned and retained via latches 163, as shown more fully in FIG. 3.

Figure 3:
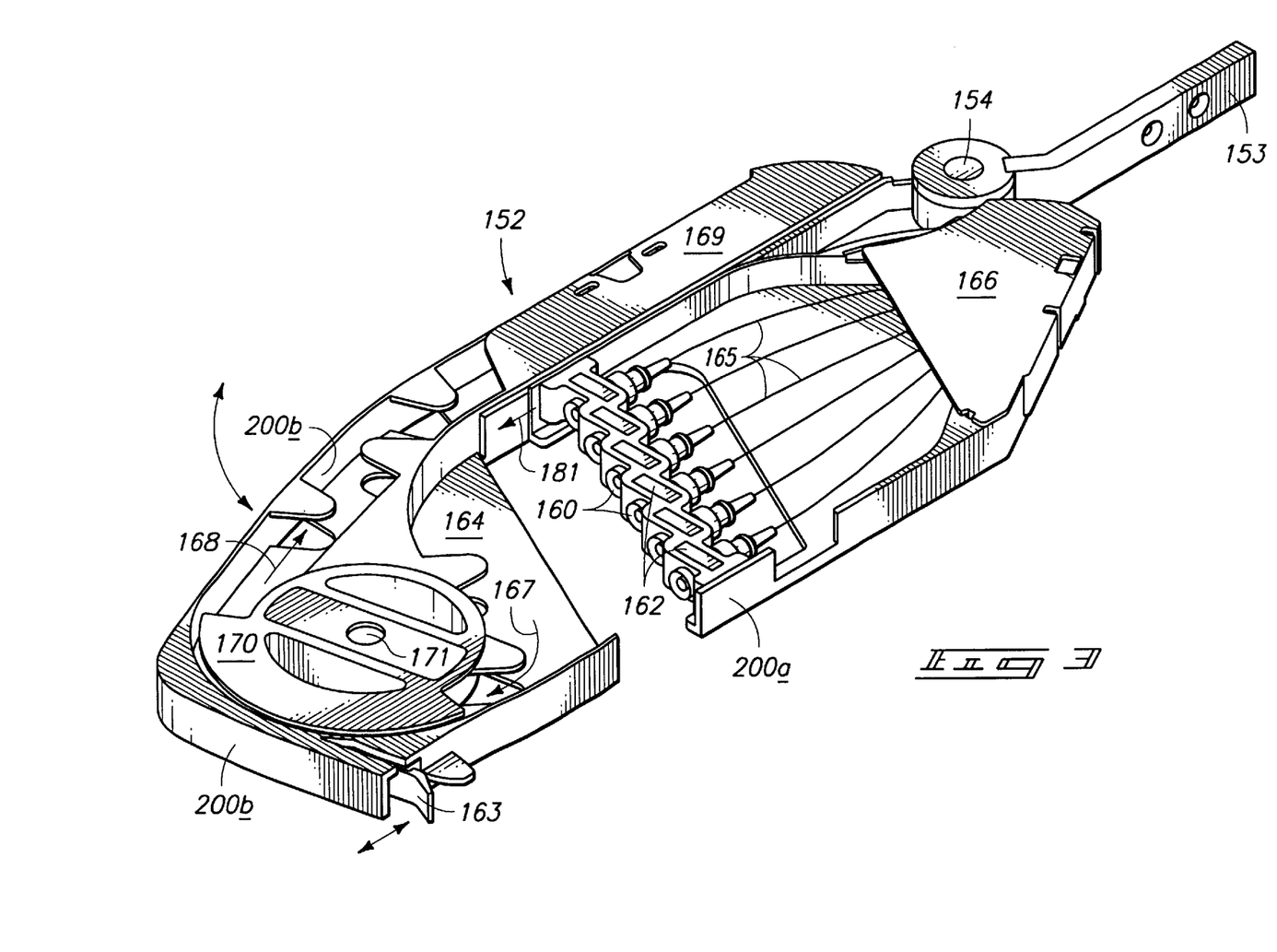
FIG. 3 is a perspective view of one embodiment of a fiber optic connector tray as contemplated by this invention.

FIG. 3 is a perspective view of one of the fiber optic connector trays 152 shown in FIG. 2. FIG. 3 illustrates mount arm 153, pivot 154 or axis 154 about which fiber optic connector tray 152 pivots or rotates to provide better access to the fiber optic connectors 160 and 161 within fiber optic connector tray 152. FIG. 3 further illustrates fiber pathway lid 169, fiber retention lid 166, fiber control lid 170, and fiber control lid access 171. Again, fiber connected to fiber optic connectors 160 (mounted in fiber optic adapters 162) is generally routed through fiber pathway 167 and around to fiber optic cable pathway 168, which proceeds under fiber pathway lid 169 and back toward the access 154 for the routing and management. Fiber retention lid 166 may rotate as shown, or it may also slide, for ease of access.

A desirable feature about the embodiments of a fiber optic connector tray as illustrated in figures such as FIG. 3 is a system which eliminates unnecessary slack in fiber as the fiber optic connector tray 152 is pivoted about axis 154. Very generally, in the embodiments shown, the tray housing is a combination of two elements which slide relative to one another, namely, first tray body structure 200a on which the fiber optic connectors are mounted, and second tray body structure 200b. Very generally, as fiber optic connector tray 152 is pivoted about axis 154, first tray body structure 200a slides relative to second tray body structure 200b, thereby reducing or eliminating the unnecessary pulling on fiber optic cables 165 as the fiber optic connector tray 152 is pivoted.

Another way to avoid unnecessary pulling on fiber optic cables is to provide substantial excess slack in the fiber optic cables such that when they are rotated the fiber optic cables are not pulled from the connectors or undue pressure is not placed upon them. This is undesirable from a fiber management perspective and from a fiber bend radius control perspective, and embodiments of the system contemplated by this invention eliminate the need to provide such unnecessary additional slack in fiber optic cables and also eliminates unnecessary and undesirable pulling on fiber optic cables attached to fiber optic connectors. This is described and illustrated more fully below.

The fiber optic connectors generally connect equipment or outside plant fiber optic cables to other connectors, and the fiber optic cables 165 will therefore typically be referred to as the equipment or OSP side of the connector or tray. The other side of the tray will typically be referred to as the patch side of the tray because the fiber optic cables on that side pass through fiber pathway 168 to exit the tray 152, and are generally routed to other fiber optic connectors for patching or connecting to other lines or equipment.

FIG. 4 is a top view of the embodiment of the invention illustrated in FIG. 3, showing fiber optic connector tray 152, fiber optic cables 165 and tray housing lid 166 in its first position and its second position rotated outward to allow better access to fiber optic cables 165. It should be noted that FIG. 4 illustrates the first tray body structure 200a in a first or un-rotated position relative to second tray body structure 200b. The tray body, being comprised of a first tray body structure 200a and a second tray body structure 200b, has a longitudinal direction which in the embodiment shown, is approximately aligned with the fiber optic connectors mounted or retained by the first tray body structure 200a.

FIG. 4 also illustrates how slack is taken up in the fiber exit pathway on the patch side or outside of the fiber optic connector trays 152. As the tray 152 is rotated (as shown in FIG. 1) and represented by arrow 156, slack is created in the exiting patch fiber optic cables 159 because the tray 152 is pivoted in that direction and there is a distance from the center of the fiber pathway exit 157 and pivot axis 154. It is estimated that approximately one to one and one-half inches of slack are taken up by the movement of the first tray body structure 200a. The fiber entrance pathway 158 is typically where fiber optic cables 165 from the equipment or outside plant side of the fiber optic cable connectors, are routed. The center line of the fiber entrance pathway 158 should generally about equal distance from the pivot axis 154 as the center line of the fiber pathway exit 157.

Thus, as the tray 152 is pivoted about axis 154 the slack created in the fiber exit pathway 168 is taken up by the relative movement of first tray body structure 200a.

Figure 5:
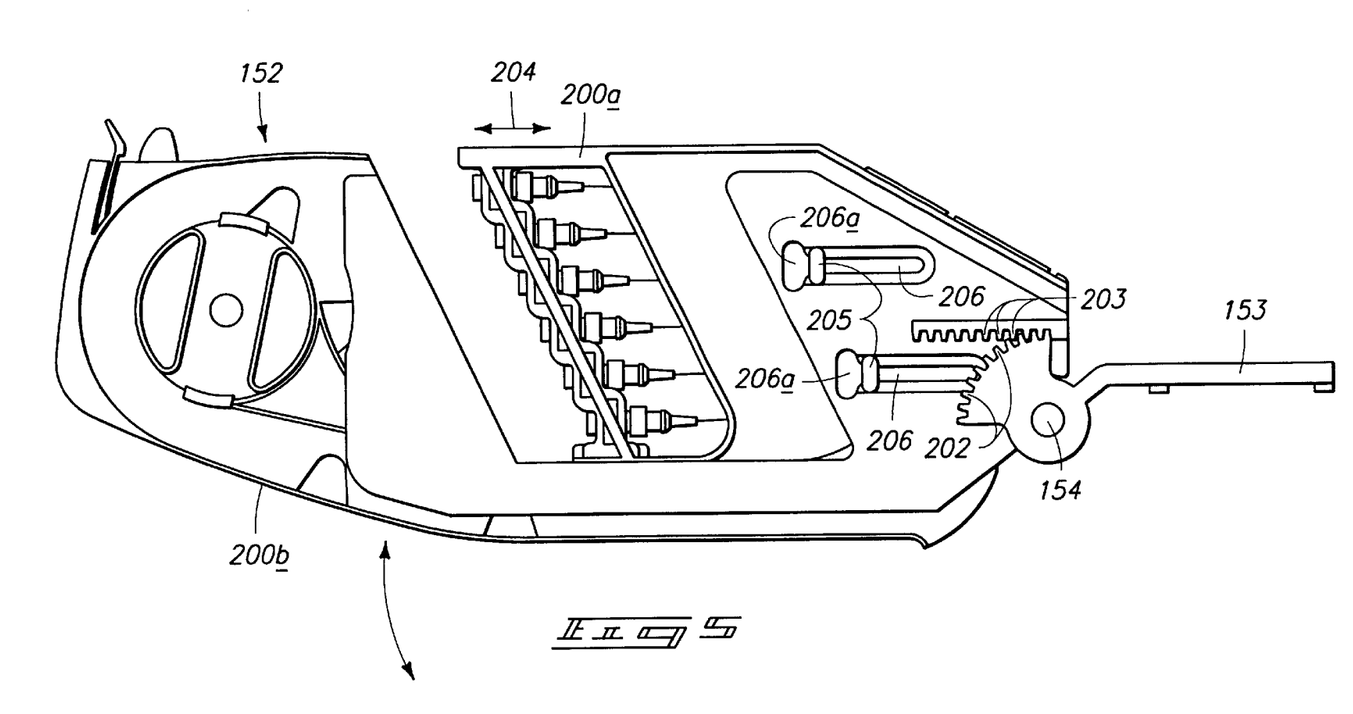
FIG. 5 is a bottom view of the fiber optic connector tray illustrated in FIG. 3.

FIG. 5 is a bottom view of an embodiment of the fiber optic connector tray 152 illustrated in FIGS. 3 and 4, showing the first tray body structure 200a in an un-rotated position, second tray body structure 200b, mount arm 153, axis 154, slide guide apertures 206 with guide aperture first end 206a and with slide guides 205 in slide guide apertures 206. As fiber optic connector tray 152 is rotated or pivoted about axis 154, mount arm gears 202 interact with tray housing gears 203 to cause first tray body structure 200a to slide in the directions indicated by arrow 204 relative to second tray body structure 200b.

While FIG. 5 shows one way to cause the relative movement of the two housing sections, this invention is not limited to the specific ways shown in FIG. 5, but others may also be used, as described more fully below with respect to FIGS. 8 and 9, and other ways.

Figure 6:
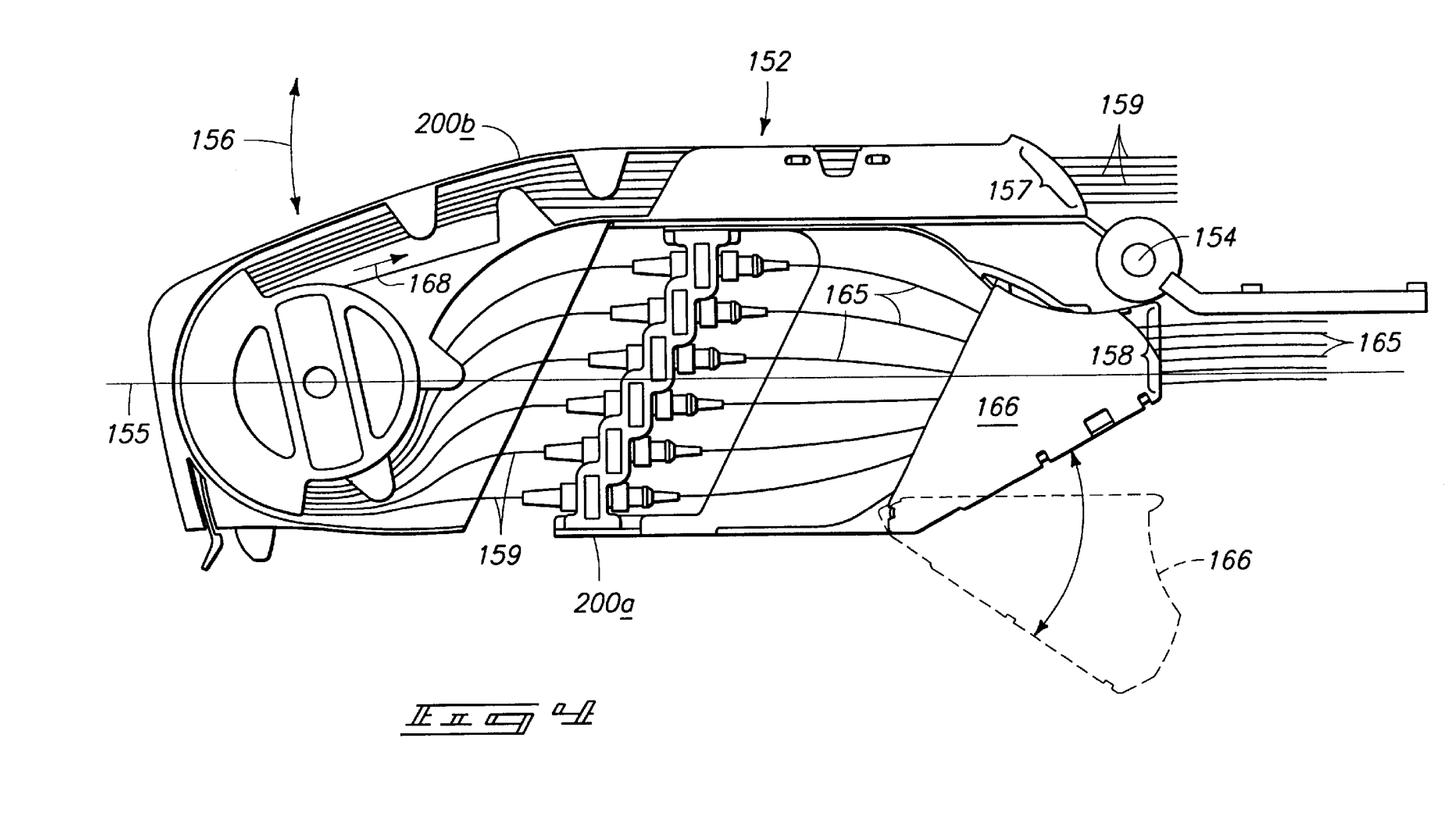
FIG. 6 is also a bottom view of the fiber optic connector tray illustrated in FIG. 3, only wherein the tray has been rotated, FIG. 6 illustrating the relative movement of the fiber optic connectors to manage fibers when the tray is pivoted.

FIG. 6 is a bottom view of fiber optic connector tray 152 in the rotated position and shows a different relative position between, first tray body structure 200a and second tray body structure 200b.

Fiber optic connector tray 152 has been rotated about axis 154 while mount arm 153 is fixed or attached to the framework. Mount arm gears 202 have interacted with tray housing gear 203 to cause first tray body structure 200a to move relative to the remainder of the tray. The corresponding mount arm gears are considered to be a link as used herein.

FIG. 6 further shows slide guides 205 in their rotated position in slide guide apertures 206, and away from slide guide aperture, first end 206a. The rotation of fiber optic connector tray 152 causing relative movement represented by arrow 204 also provides better and easier access to fiber optic cables within the fiber optic connector tray 152, as can be seen in FIG. 6. Latch 163 is generally utilized to latch or attach tray support rails 110 or 111 (not shown in FIG. 6) to lock or hold the trays in the un-rotated position. When it is desired to rotate a tray, latch 163 may be depressed or released and allow it to be rotated inwardly toward the fiber support area of the fiber distribution frame.

Figure 7:
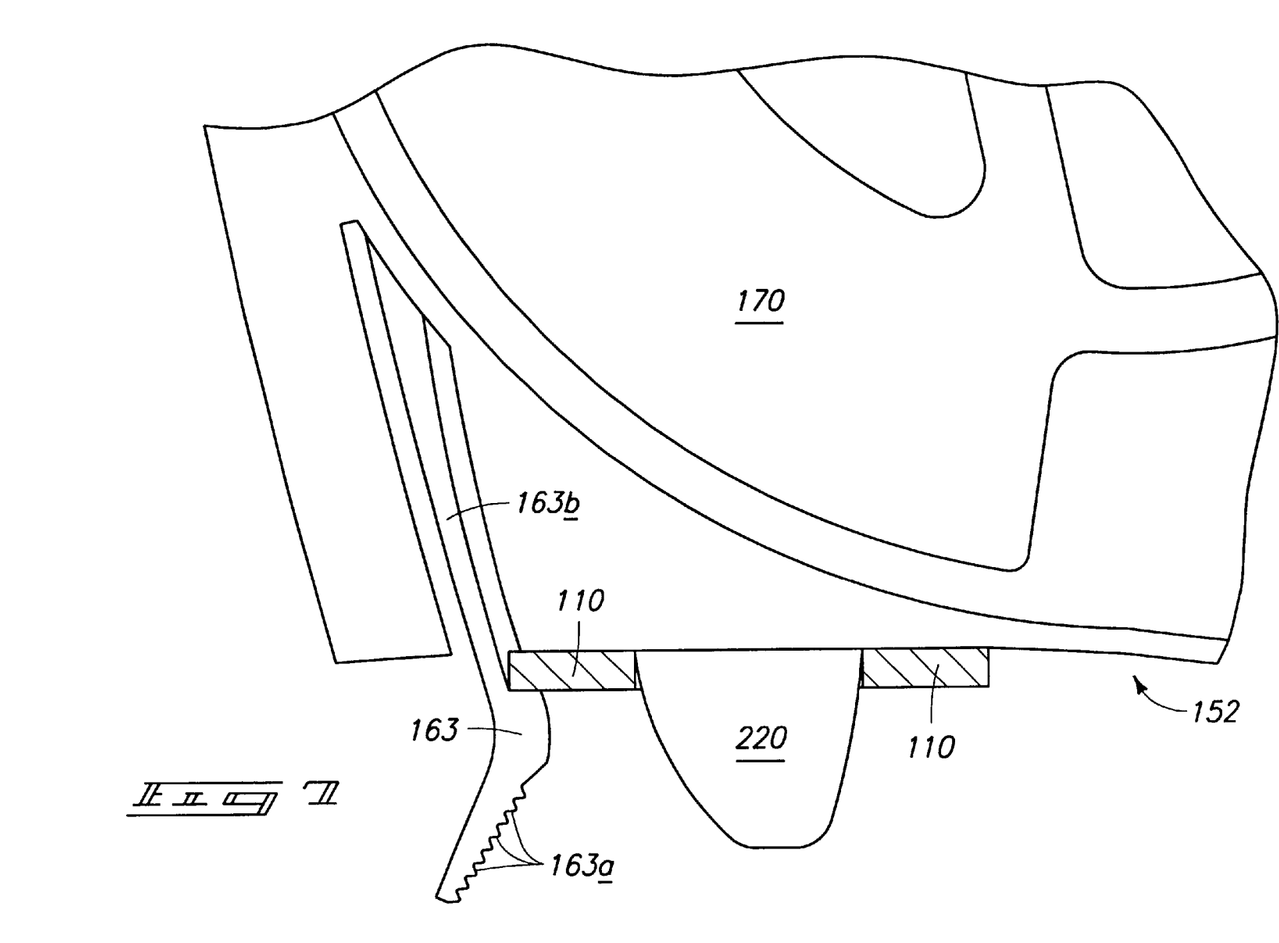
FIG. 7 is a detail of the latch mechanism utilized to align and secure the fiber optic connector trays to support rails attached to the framework.

FIG. 7 is a more detailed drawing illustrating the latch 163 as it would retain fiber optic connector tray 152 to tray support rail 110 (or item 111, not shown in FIG. 7). The latch notches 163a allow a user to more easily bend the latch due to flexibility of latch support 163b. Tab 220 inserts into an aperture in tray support rail 110 to better align the fiber optic connector tray in tray support rail 110. FIG. 7 further illustrates fiber control lid 170.

Figure 8:
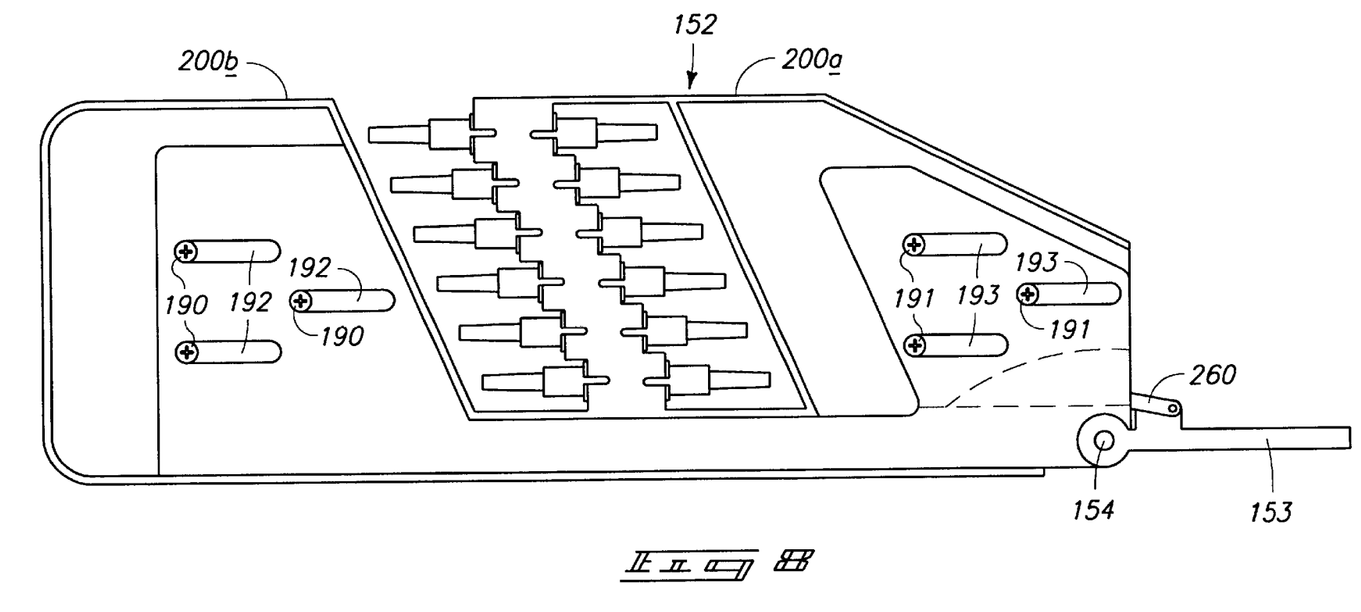
FIG. 8 is a bottom view of an alternative embodiment which utilizes a lever arm to eliminate excessive slack in the fiber optic cables.

FIG. 8 shows another embodiment of a link arm mechanism which may be utilized to cause a relative movement of the first tray body structure 200a relative to the second tray body structure 200b. FIG. 8 illustrates the fiber optic connector tray 152 in the un-rotated position, but illustrates link arm 260 or link 260 mounted both to mount arm 153 and to first tray body structure 200a. Screws 190 and 191 act as slide guides within slide guide apertures 192 and 193, also screw apertures, to provide the relative movement.

Figure 9:
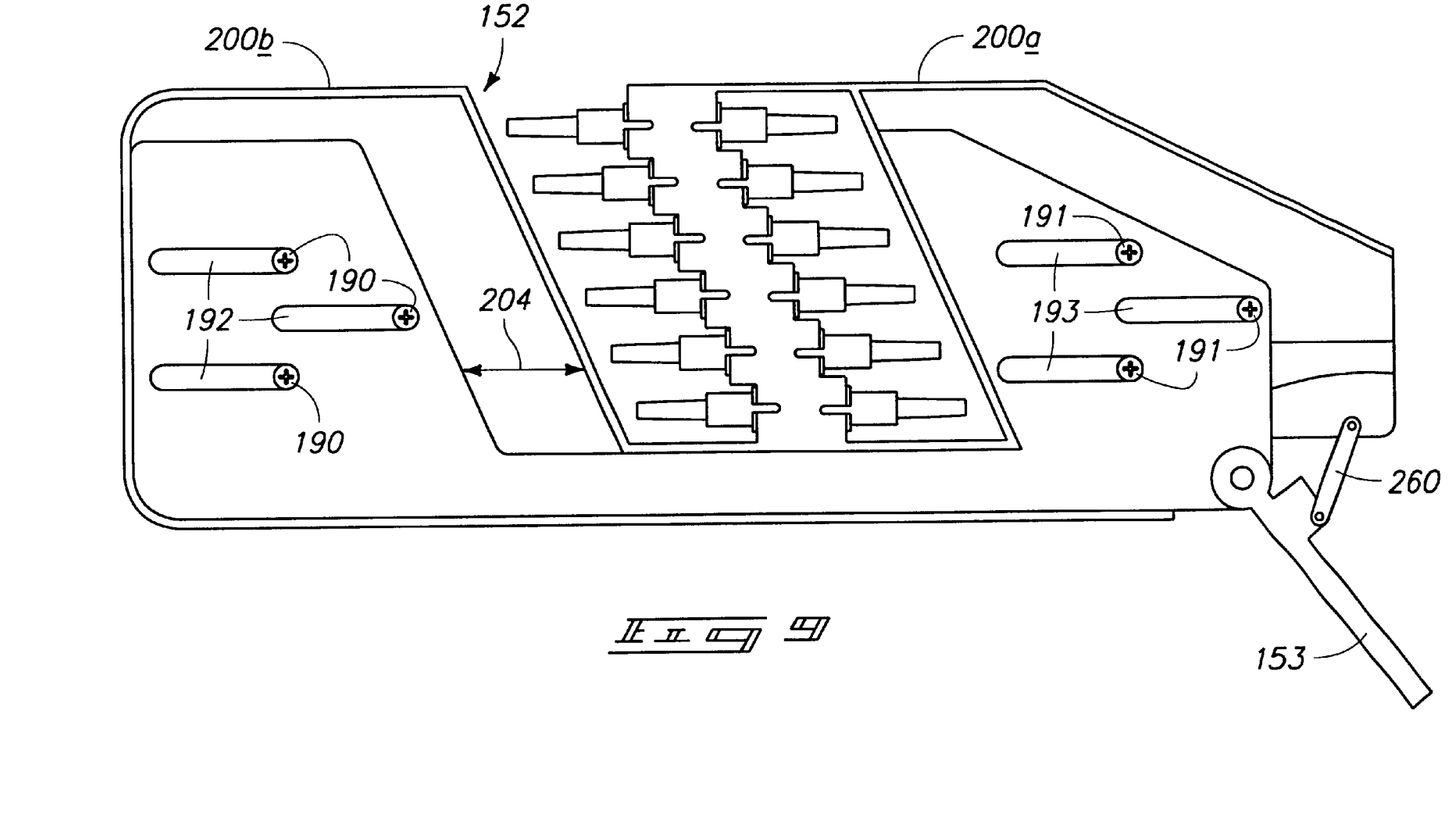
FIG. 9 is the bottom view of the embodiment of the invention illustrated in FIG. 8, only wherein the fiber optic connector tray has been rotated inwardly (also as shown in FIG. 1).

FIG. 9 illustrates the embodiment of the invention shown in FIG. 8 in the fully rotated position. As can be seen, link arm 260 is attached to first tray body structure 200a and has caused relative movement of first tray body structure 200a relative to second tray body structure 200b, causing the relative movement illustrated by arrow 204. Screws 190 and 191 have moved within screw apertures 192 and 193 to guide, limit and control the relative movement or sliding.

The unique configuration of fiber optic connector trays as illustrated in this invention allows for the high density termination of fiber optic cables in fiber optic connectors, to an extent not heretofore accomplished by the prior art.

As will be appreciated by those of reasonable skill in the art, there are numerous embodiments to this invention, and variations of elements and components which may be used, all within the scope of this invention.

One embodiment of this invention for example involves a fiber optic connector tray system comprising: a mount arm disposed to operatively attach to a framework; a tray body pivotally mounted to the mount arm, the tray body comprised of: a first tray body structure disposed to receive and retain fiber optic connectors, the first tray body structure being movably attached to a second tray body structure, the second tray body structure including a fiber optic cable exit pathway; and a link operatively attached to the mount arm and to the first tray body structure, the link disposed relative to the first tray body structure and the mount arm such that when the tray body is pivoted, the link causes the movement of the first tray body structure relative to the second tray body structure.

Further embodiments are more specifically for example: wherein the movement of the first tray body structure relative to the second tray body structure is in a longitudinal direction of the fiber optic connectors; wherein the movement of the first tray body structure relative to the second tray body structure is a sliding movement; wherein the movement of the first tray body structure relative to the second tray body structure is linear; and/or wherein the link is comprised of a first gear set operatively attached to the mount arm, and a corresponding second gear set operatively attached to the first tray body structure, the first gear being adapted to interact with the second gear upon the pivoting of the tray body, thereby causing the movement of the first tray body structure relative to the second tray body structure.

Another embodiment of the invention is directed to a fiber distribution frame with the tray system specified above combined therewith.

Yet another embodiment of this invention is a fiber distribution system comprising: a framework with a first side and a second side; a first plurality of fiber optic connector trays pivotally mounted in a vertical arrangement on the first side of the framework such that the fiber optic connector trays pivot toward the center of the framework; a second plurality of fiber optic connector trays pivotally mounted in a vertical arrangement on the second side of the framework such that the fiber optic connector trays pivot toward the center of the framework; each of the first plurality of fiber optic connector trays including a plurality of fiber optic connectors mounted therein such that when the connector trays are rotated toward the center of the framework, access is provided to the fiber optic connectors; and wherein each of the second plurality of fiber optic connector trays including a plurality of fiber optic connectors mounted therein such that when the connector trays are rotated toward the center of the framework, access is provided to the fiber optic connectors.

A further embodiment of the invention is wherein the fiber optic connectors are mounted in the first plurality of connector trays and in the second plurality of connector trays, in a staggered arrangement, and further in combination with the tray system as also stated above, namely wherein the first and the second plurality of fiber optic connector trays are comprised of: a mount arm disposed to operatively attach to a framework; a tray body pivotally mounted to the mount arm, the tray body comprised of: a first tray body structure disposed to receive and retain fiber optic connectors, the first tray body structure being movably attached to a second tray body structure, the second tray body structure including a fiber optic cable exit pathway; and a link operatively attached to the mount arm and to the first tray body structure, the link disposed relative to the first tray body structure and the mount arm such that when the tray body is pivoted, the link causes the movement of the first tray body structure relative to the second tray body structure.

Another embodiment of the invention is a fiber distribution frame comprising: a framework with a first framework side and a second framework side; a vertically oriented first partition wall and an opposing vertically oriented second partition wall, the first partition wall and the second partition wall each having a corresponding transverse fiber optic cable pathway at an intermediate vertical location, the first partition wall and the second partition wall defining a fiber support area with a plurality of vertically spaced apart fiber supports in the fiber support area; the first partition wall and the second partition wall each further having a corresponding transverse bottom fiber optic cable pathway at a lower end of the framework; a framework with a first side and a second side; a first plurality of fiber optic connector trays pivotally mounted in a vertical arrangement on the first side of the framework such that the fiber optic connector trays pivot toward the center of the framework; a second plurality of fiber optic connector trays pivotally mounted in a vertical arrangement on the second side of the framework such that the fiber optic connector trays pivot toward the center of the framework; each of the first plurality of fiber optic connector trays including a plurality of fiber optic connectors mounted therein such that when the connector trays are rotated toward the center of the framework, access is provided to the fiber optic connectors; and each of the second plurality of fiber optic connector trays including a plurality of fiber optic connectors mounted therein such that when the connector trays are rotated toward the center of the framework, access is provided to the fiber optic connectors.

Further embodiments of the immediately preceding embodiment are more specifically for example: wherein the movement of the first tray body structure relative to the second tray body structure is in a longitudinal direction of the fiber optic connectors; wherein the movement of the first tray body structure relative to the second tray body structure is a sliding movement; wherein the movement of the first tray body structure relative to the second tray body structure is linear; and/or wherein the link is comprised of a first gear set operatively attached to the mount arm, and a corresponding second gear set operatively attached to the first tray body structure, the first gear being adapted to interact with the second gear upon the pivoting of the tray body, thereby causing the movement of the first tray body structure relative to the second tray body structure.

A still further embodiment of the invention is a fiber distribution frame comprising: a framework with a first side and a second side, the first side including a first section above a second section, and the second side including a third section above a fourth section; a first fiber optic connector assembly mounted on the framework in the first section; a second fiber optic connector assembly mounted on the framework in the second section; a third fiber optic connector assembly mounted on the framework in the third section; a fourth fiber optic connector assembly mounted on the framework in the fourth section; the first, second, third and fourth fiber optic connector assemblies each have fiber optic contents including fiber optic connectors; a plurality of vertically spaced apart fiber supports mounted between the first side and the second side of the framework, each fiber support adapted to receive a fiber optic cable; a vertically oriented first wall between the first section of the framework and the plurality of fiber supports; a vertically oriented second wall between second section of the framework and the plurality of fiber supports; a vertically oriented third wall between the third section of the framework and the plurality of fiber supports; a vertically oriented fourth wall between the fourth section of the framework and the plurality of fiber supports; wherein space between the first wall and the second wall define a first transverse fiber pathway, space below the second wall defines a second transverse fiber pathway, space between the third wall and the fourth wall define a third transverse fiber pathway, and further wherein space below the fourth wall defines a fourth transverse fiber pathway; and further wherein the first, second, third and fourth fiber optic connector assemblies are each comprised of a plurality of trays comprising: a mount arm disposed to operatively attach to a framework; a tray body pivotally mounted to the mount arm, the tray body comprised of: a first tray body structure disposed to receive and retain fiber optic connectors, the first tray body structure being movably attached to a second tray body structure, the second tray body structure including a fiber optic cable exit pathway; and a link operatively attached to the mount arm and to the first tray body structure, the link disposed relative to the first tray body structure and the mount arm such that when the tray body is pivoted, the link causes the movement of the first tray body structure relative to the second tray body structure.

Further embodiments of the immediately preceding embodiments may include configurations: wherein the first wall, the second wall, the third wall and the fourth wall are translucent; wherein fiber optic cables connected to the first fiber optic connector assembly are routed through the first transverse fiber pathway, supported on one of the plurality of fiber supports, and routed to the third fiber optic connector assembly in the third section; and/or further wherein fiber optic cables connected to the second fiber optic connector assembly are routed through the second transverse fiber pathway, supported on one of the plurality of fiber supports, and routed to the fourth fiber optic connector assembly.

In compliance with the statute, the invention has been described in is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fiber optic connector tray system comprising:
   a. a mount arm disposed to operatively attach to a framework;
   b. a tray body pivotally mounted to the mount arm, the tray body comprised of:
      i. a first tray body structure disposed to receive and retain fiber optic connectors, the first tray body structure being movably attached to a second tray body structure, the second tray body structure including a fiber optic cable exit pathway; and
      ii. a link operatively attached to the mount arm and to the first tray body structure, the link being disposed relative to the first tray body structure and the mount arm such that when the tray body is pivoted, the link causes movement of the first tray body structure relative to the second tray body structure.

2. A fiber optic cable tray system as recited in claim 1, and further wherein the movement of the first tray body structure relative to the second tray body structure is in a longitudinal direction of the fiber optic connectors.

3. A fiber optic cable tray system as recited in claim 1, and further wherein the movement of the first tray body structure relative to the second tray body structure is a sliding movement.

4. A fiber optic cable tray system as recited in claim 1, and further wherein the movement of the first tray body structure relative to the second tray body structure is linear.

5. A fiber optic cable tray system as recited in claim 1, and further wherein the link is comprised of a first gear set operatively attached to the is mount arm, and a corresponding second gear set operatively attached to the first tray body structure, the first gear being adapted to interact with the second gear upon the pivoting of the tray body, thereby causing the movement of the first tray body structure relative to the second tray body structure.

6. A fiber distribution frame system comprising:
   a. a distribution framework with a plurality of fiber optic connector trays mounted in a vertical array on the framework;
   b. the one or more fiber optic connector trays are comprised of:
      i. a mount arm disposed to operatively attach to a framework;
      ii. a tray body pivotally mounted to the mount arm, the tray body being comprised of:
         (a) a first tray body structure disposed to receive and retain fiber optic connectors, the first tray body structure being movably attached to a second tray body structure, the second tray body structure including a fiber optic cable exit pathway; and
         (b) a link operatively attached to the mount arm and to the first tray body structure, the link disposed relative to the first tray body structure and the mount arm such that when the tray body is pivoted, the link causes the movement of the first tray body structure relative to the second tray body structure.

7. A fiber optic cable tray system as recited in claim 6, and further wherein the movement of the first tray body structure relative to the second tray body structure is in a longitudinal direction of the fiber optic connectors.

8. A fiber optic cable tray system as recited in claim 6, and further wherein the movement of the first tray body structure relative to the second tray body structure is a sliding movement.

9. A fiber optic cable tray system as recited in claim 6, and further wherein the movement of the first tray body structure relative to the second tray body structure is linear.

10. A fiber optic cable tray system as recited in claim 6, and further wherein the link is comprised of a first gear set operatively attached to the mount arm, and a corresponding second gear set operatively attached to the first tray body structure, the first gear being adapted to interact with the second gear upon the pivoting of the tray body, thereby causing the movement of the first tray body structure relative to the second tray body structure.

11. A fiber distribution frame system comprising:
   a. a framework with a first side and a second side;
   b. a first plurality of fiber optic connector trays pivotally mounted in a vertical arrangement on the first side of the framework such that the fiber optic connector trays pivot toward the center of the framework;
   c. a second plurality of fiber optic connector trays pivotally mounted in a vertical arrangement on the second side of the framework such that the fiber optic connector trays pivot toward the center of the framework;
   d. each of the first plurality of fiber optic connector trays including a plurality of fiber optic connectors mounted therein such that when the connector trays are rotated toward the center of the framework, access is provided to the fiber optic connectors; and
   e. each of the second plurality of fiber optic connector trays including a plurality of fiber optic connectors mounted therein such that when the connector trays are rotated toward the center of the framework, access is provided to the fiber optic connectors.

12. A fiber distribution frame system as recited in claim 11, and further wherein the fiber optic connectors are mounted in the first plurality of connector trays and in the second plurality of connector trays, in a staggered arrangement.

13. A fiber distribution frame system as recited in claim 11, and further wherein the first and the second plurality of fiber optic connector trays are comprised of:
   a. a mount arm disposed to operatively attach to a framework;
   b. a tray body pivotally mounted to the mount arm, the tray body comprised of:
      i. a first tray body structure disposed to receive and retain fiber optic connectors, the first tray body structure being movably attached to a second tray body structure, the second tray body structure including a fiber optic cable exit pathway; and
      ii. a link operatively attached to the mount arm and to the first tray body structure, the link disposed relative to the first tray body structure and the mount arm such that when the tray body is pivoted, the link causes movement of the first tray body structure relative to the second tray body structure.

14. A fiber optic cable tray system as recited in claim 13, and further wherein the movement of the first tray body structure relative to the second tray body structure is in a longitudinal direction of the fiber optic connectors.

15. A fiber optic cable tray system as recited in claim 13, and further wherein the movement of the first tray body structure relative to the second tray body structure is a sliding movement.

16. A fiber optic cable tray system as recited in claim 13, and further is wherein the movement of the first tray body structure relative to the second tray body structure is linear.

17. A fiber optic cable tray system as recited in claim 13, and further wherein the link is comprised of a first gear set operatively attached to the mount arm, and a corresponding second gear set operatively attached to the first tray body structure, the first gear being adapted to interact with the second gear upon the pivoting of the tray body, thereby causing the movement of the first tray body structure relative to the second tray body structure.

18. A fiber distribution frame comprising:
   a. a framework with a first side and a second side;
   b. a vertically oriented first partition wall and an opposing vertically oriented second partition wall, the first partition wall and the second partition wall each having a corresponding transverse fiber optic cable pathway at an intermediate vertical location, the first partition wall and the second partition wall defining a fiber support area with a plurality of vertically spaced apart fiber supports in the fiber support area;
   c. the first partition wall and the second partition wall each further having a corresponding transverse bottom fiber optic cable pathway at a lower end of the framework;
   d. a first plurality of fiber optic connector trays pivotally mounted in a vertical arrangement on the first side of the framework such that the fiber optic connector trays pivot toward the center of the framework;
   e. a second plurality of fiber optic connector trays pivotally mounted in a vertical arrangement on the second side of the framework such that the fiber optic connector trays pivot toward the center of the framework;
   f. each of the first plurality of fiber optic connector trays including a plurality of fiber optic connectors mounted therein such that when the connector trays are rotated toward the center of the framework, access is provided to the fiber optic connectors;
   g. each of the second plurality of fiber optic connector trays including a plurality of fiber optic connectors mounted therein such that when the connector trays are rotated toward the center of the framework, access is provided to the fiber optic connectors; and
   h. wherein each of the first and the second plurality of fiber optic connector trays includes a tray body pivotally mounted to the mount arm, the tray body comprised of:
      i. a first tray body structure disposed to receive and retain fiber optic connectors, the first tray body structure being movably attached to a second tray body structure, the second tray body structure including a fiber optic cable exit pathway; and
      ii. a link operatively attached to the mount arm and to the first tray body structure, the link being disposed relative to the first tray body structure and the mount arm such that when the tray body is pivoted, the link causes movement of the first tray body structure relative to the second tray body structure.

19. A fiber optic cable tray system as recited in claim 18, and further wherein the movement of the first tray body structure relative to the second tray body structure is in a longitudinal direction of the fiber optic connectors.

20. A fiber optic cable tray system as recited in claim 18, and further wherein the movement of the first tray body structure relative to the second tray body structure is a sliding movement.

21. A fiber optic cable tray system as recited in claim:i 18, and further wherein the movement of the first tray body structure relative to the second tray body structure is linear.

22. A fiber optic cable tray system as recited in claim 18, and further wherein the link is comprised of a first gear set operatively attached to the mount arm, and a corresponding second gear set operatively attached to the first tray body structure, the first gear being adapted to interact with the second gear upon the pivoting of the tray body, thereby causing the movement of the first tray body structure relative to the second tray body structure.

23. A fiber distribution frame comprising:
   a. a framework with a first side and a second side, the first side including a first section above a second section, and the second side including a third section above a fourth section;
   b. a first fiber optic connector assembly mounted on the framework in the first section;
   c. a second fiber optic connector assembly mounted on the framework in the second section;
   d. a third fiber optic connector assembly mounted on the framework in the third section;
   e. a fourth fiber optic connector assembly mounted on the framework in the fourth section;
   f. the first, second, third and fourth fiber optic connector assemblies each have fiber optic contents including fiber optic connectors;
   g. a plurality of vertically spaced apart fiber supports mounted between the first side and the second side of the framework, each fiber support adapted to receive a fiber optic cable;
   h. a vertically oriented first wall between the first section of the framework and the plurality of fiber supports;

i. a vertically oriented second wall between second section of the framework and the plurality of fiber supports;
j. a vertically oriented third wall between the third section of the framework and the plurality of fiber supports;
k. a vertically oriented fourth wall between the fourth section of the framework and the plurality of fiber supports;
l. wherein space between the first wall and the second wall defines a first transverse fiber pathway, space below the second wall defines a second transverse fiber pathway, space between the third wall and the fourth wall defines a third transverse fiber pathway, and further wherein space below the fourth wall defines a fourth transverse fiber pathway; and
m. further wherein the first, second, third and fourth fiber optic connector assemblies are each comprised of a plurality of trays comprising:
  i. a mount arm disposed to operatively attach to a framework;
  ii. a tray body pivotally mounted to the mount arm, the tray body comprised of:
    (a) a first tray body structure disposed to receive and retain fiber optic connectors, the first tray body structure being movably attached to a second tray body structure, the second tray body structure including a fiber optic cable exit pathway; and
    (b) a link operatively attached to the mount arm and to the first tray body structure, the link disposed relative to the first tray body structure and the mount arm such that when the tray body is pivoted, the link causes movement of the first tray body structure relative to the second tray body structure.

24. A fiber distribution frame as recited in claim 23, and further wherein the movement of the first tray body structure relative to the second tray body structure is in a longitudinal direction of the fiber optic connectors.

25. A fiber distribution frame as recited in claim 23, and further wherein the movement of the first tray body structure relative to the second tray body structure is a sliding movement.

26. A fiber distribution frame as recited in claim 23, and further wherein the movement of the first tray body structure relative to the second tray body structure is linear.

27. A fiber distribution frame as recited in claim 23, and further wherein the link is comprised of a first gear set operatively attached to the mount arm, and a corresponding second gear set operatively attached to the first tray body structure, the first gear being adapted to interact with the second gear upon the pivoting of the tray body, thereby causing the movement of the first tray body structure relative to the second tray body structure.

28. A fiber distribution frame as recited in claim 23, and further wherein the first wall, the second wall, the third wall and the fourth wall are translucent.

29. A fiber distribution frame as recited in claim 23, and further wherein fiber optic cables connected to the first fiber optic connector assembly are routed through the first transverse fiber pathway, supported on one of the plurality of fiber supports, and routed to the third fiber optic connector assembly in the third section.

30. A fiber distribution frame as recited in claim 23, and further wherein fiber optic cables connected to the second fiber optic connector assembly are routed through the second transverse fiber pathway, supported on one of the plurality of fiber supports, and routed to the fourth fiber optic connector assembly.

* * * * *

UNITED STATES PATENT AND TRADEMARK OFFICE
CERTIFICATE OF CORRECTION

PATENT NO. : 6,360,050 B1
DATED : March 19, 2002
INVENTOR(S) : Moua et al.

It is certified that error appears in the above-identified patent and that said Letters Patent is hereby corrected as shown below:

Column 1,
Line 28, should read -- fiber optic cables are routed into the facility --.

Column 6,
Line 11, should read -- different relative position between first tray --.
Line 22, should read -- away from slide guide aperture first end 206a --.

Column 9,
Line 33, should read -- In compliance with the statute, the invention has been described in language more or less specific as to structural and methodical features. It is to be understood... --.

Column 10,
Line 3, should read -- comprised of a first gear set operatively attached to the mount arm --.

Column 12,
Line 34, should read -- A fiber optic cable tray system as recited in claim 18, and further --.

Signed and Sealed this

Twenty-ninth Day of April, 2003

JAMES E. ROGAN
*Director of the United States Patent and Trademark Office*

(12) EX PARTE REEXAMINATION CERTIFICATE (5965th)
United States Patent
Moua et al.

(10) Number: US 6,360,050 C1
(45) Certificate Issued: Oct. 23, 2007

(54) HIGH DENSITY FIBER DISTRIBUTION TRAY SYSTEM

(75) Inventors: Teng K. Moua, Greenacres, WA (US); Reese G. Larson, Spokane, WA (US); Blaise G. Blair, Post Falls, ID (US); Linsday D. Standish, Spokane, WA (US); Ted C. Vollmer, Spokane, WA (US); Paul A. Knight, Spokane, WA (US)

(73) Assignee: Telect, Inc., Liberty Lake, WA (US)

Reexamination Request:
No. 90/006,987, Mar. 29, 2004

Reexamination Certificate for:
Patent No.: 6,360,050
Issued: Mar. 19, 2002
Appl. No.: 09/658,297
Filed: Sep. 8, 2000

Certificate of Correction issued Apr. 29, 2003.

(51) Int. Cl.
*G02B 6/38* (2006.01)
*G02B 6/44* (2006.01)
*G02B 6/00* (2006.01)

(52) U.S. Cl. .................................. 385/135; 385/136
(58) Field of Classification Search .................. None
See application file for complete search history.

(56) References Cited

U.S. PATENT DOCUMENTS

4,765,710 A * 8/1988 Burmeister et al. ......... 385/134
5,946,440 A * 8/1999 Puetz ........................ 385/135

* cited by examiner

*Primary Examiner*—Erik Kielin (57) ABSTRACT

Disclosed is a fiber optic connector tray system for improved fiber optic cable management, especially in situations requiring higher fiber optic cable and connector density. Embodiments of the invention include tray bodies which are mounted to a framework and pivot or rotate to provide access to fiber optic connectors. The pivot or rotation further provides a mechanism to take up additional slack resulting from the pivoting.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 and 13–30 is confirmed.

Claim 11 is determined to be patentable as amended.

Claim 12, dependent on an amended claim, is determined to be patentable.

New claims 31–37 are added and determined to be patentable.

11. A fiber distribution frame system comprising:
a. a framework with a first side and a second side;
b. a first plurality of fiber optic connector trays pivotally mounted in a vertical arrangement on the first side of the framework such that the fiber optic connector trays pivot toward the center of the framework;
c. a second plurality of fiber optic connector trays pivotally mounted in a vertical arrangement on the second side of the framework such that the fiber optic connector trays pivot toward the center of the framework;
d. each of the plurality of fiber optic connector trays including a plurality of fiber optic connectors mounted therein such that [when] the connector trays are [rotated] *rotatable* toward *and away from* the center of the framework, *wherein* access is provided to the fiber optic connectors *by rotation of the connector trays only toward the center of the framework*; and
e. each of the second plurality of fiber optic connector trays including a plurality of fiber optic connectors mounted therein such that [when] the connector trays are [rotated] *rotatable* toward *and away from* the center of the framework, *wherein* access is provided to the fiber optic connectors *by rotation of the connector trays only toward the center of the framework.*

*31. A fiber distribution frame system as recited in claim 11, and further comprising a fiber optic cable storage area between the first plurality of fiber optic connector trays and the second plurality of fiber optic trays.*

*32. A fiber distribution frame system as recited in claim 31, and further comprising a plurality of fiber optic cable supports in the fiber optic cable storage area.*

*33. A fiber distribution frame system as recited in claim 32, and further wherein each of the plurality of fiber optic cables supports includes a fiber optic surface which maintains a minimum bend radius.*

*34. A fiber distribution frame system as recited in claim 11, and further comprising a first vertically oriented tray support rail positioned to initially align the first plurality of fiber optic connector trays in a desired normal position, and to prevent the first plurality of fiber optic connector trays from rotating outwardly from the center of the framework beyond the desired normal position.*

*35. A fiber distribution frame system as recited in claim 34, and further wherein the first plurality of fiber optic connector trays include a latch disposed to attach to and detach from the first vertically oriented tray support rail.*

*36. A fiber distribution frame system as recited in claim 34, and further comprising a second vertically oriented tray support rail positioned to initially align the second plurality of fiber optic connector trays in a desired normal position, and to prevent the second plurality of fiber optic connector trays from rotating outwardly from the center of the framework beyond the desired normal position.*

*37. A fiber distribution frame system as recited in claim 36, and further wherein the second plurality of fiber optic connector trays include a latch disposed to attach to and detach from the second vertically oriented tray support rail.*

\* \* \* \* \*